United States Patent [19]

Anderson, Jr. et al.

[11] Patent Number: 4,609,008
[45] Date of Patent: Sep. 2, 1986

[54] NON-FLOWING PRESSURE RESPONSIVE PILOT VALVE

[75] Inventors: William L. Anderson, Jr., Houston; Michael D. McNeely, Katy, both of Tex.; Irvin B. Weise, deceased, late of Bellaire, Tex.; by Stanley A. Weise, executor, Dallas, Tex.

[73] Assignee: Anderson-Greenwood USA, Inc., Bellaire, Tex.

[21] Appl. No.: 774,809

[22] Filed: Sep. 11, 1985

[51] Int. Cl.$^4$ .............................................. G05D 16/00
[52] U.S. Cl. ..................................... 137/488; 137/102
[58] Field of Search ................. 137/488, 485, 102, 86

[56] References Cited

U.S. PATENT DOCUMENTS

| | | | |
|---|---|---|---|
| 2,877,791 | 3/1979 | Rich | 137/488 X |
| 3,326,228 | 6/1967 | Phillips | 137/86 |
| 3,771,553 | 11/1973 | Huet | 137/488 |
| 4,250,913 | 2/1981 | Scull | 137/488 |

*Primary Examiner*—Alan Cohan
*Attorney, Agent, or Firm*—Vinson & Elkins

[57] ABSTRACT

A non-flowing pilot valve (16) for a control valve (C) in a main flow line (F) having a body (27) with an inlet fluid chamber (76), an outlet fluid chamber (106) and an intermediate fluid chamber (104) between the inlet fluid chamber (76) and the outlet fluid chamber (106). Diaphragm (34) in the fluid inlet chamber (76) is secured to a piston slidable body (40) extending within intermediate fluid chamber (104) and having a valve seat (88) thereon between inlet fluid chamber (76) and intermediate fluid chamber (104). A second fixed valve seat (64) is provided within the body (40) between the intermediate fluid chamber (104) and the outlet fluid chamber (106). A valve spool (92) has a pair of O-ring seals (94, 96) thereabout adapted to seal against the valve seats (88, 64). Unseating of the O-ring seals (94, 96) from the seats (88, 64) results from predetermined pressure changes in the sensed fluid pressure in fluid pressure chamber (76) and communicating such pressure changes through a fluid line (22) from the intermediate fluid chamber (104) to the control valve (C). An embodiment shown in FIG. 11 provides a delayed response to the control valve resulting from pressure changes in the sensed fluid pressure. The delayed response is obtained by a flow restriction (150) in a line (148) from an intermediate fluid chamber portion (144) which is separated by a diaphragm (140) from a balancing intermediate fluid portion (142).

23 Claims, 11 Drawing Figures

NON-FLOWING PRESSURE RESPONSIVE PILOT VALVE

BACKGROUND OF THE INVENTION

This invention relates to a pilot valve for a control valve in a main flow line, and more particularly to a so-called no-flow pilot valve which is non-flowing during normal operation.

A non-flowing pilot valve does not have a continuous fluid flow during its normal operating or on position when the main control valve is in a static position and throttling. The elimination of a continuous fluid flow removes many of the problems in pilot valves having a continuous fluid flow such as, for example, the clogging of orifices and the like with entrained foreign matter in the flowing fluid, or icing resulting from wet gas applications. While a very small amount of fluid may be transmitted through the pilot valve during operation, this amount is insignificant.

More importantly in many respects, however, is the sensitivity or responsiveness of the pilot valve to changes in the sensed fluid pressures. The responsiveness of a non-flowing pilot valve to pressure changes in a sensed fluid is relatively constant over its operating range and a non-flowing pilot valve is not as affected by orifice size as is a flowing pilot valve. Thus, non-flowing pilot valves have a faster response to pressure changes in the sensed fluid as compared with pilot valves having a continuous flow of fluid therethrough.

Heretofore, such as illustrated in U.S. Pat. No. 3,572,359 dated Mar. 23, 1971, non-flowing pilot valves have been utilized with a control valve in a main flow line for regulating either downstream fluid pressure or upstream fluid pressure. The fluid pressure being sensed by the pilot valve is the fluid pressure being controlled in a no-flow pilot valve, and fluid flow through the pilot valve is permitted only when the dome pressure in the control valve is being changed. The sealing and seating arrangement of the valve members in U.S. Pat. No. 3,572,359 does not result in a pilot valve with a consistently high degree of sensitivity.

U.S. Pat. No. 2,736,337 issued Feb. 28, 1956, shows a pressure regulating device which may be used as a back pressure, pressure reducing, or liquid level control device to control fluid pressure. A pilot valve is shown which controls a main valve in a main pressure flow line. However, the regulating device is controlled by a pressure differential between the predetermined pressure and the pressure being controlled. The main control valve has a diaphragm which is acted upon by fluid pressure from the pilot valve, thereby to effect control of the fluid pressure in the flow line having the control valve therein.

SUMMARY OF THE INVENTION

The present invention is directed to a no-flow pilot valve for regulating fluid pressure in a control valve for a main flow line with flow occurring through the pilot valve only when the output or dome pressure to the control valve is being changed through an intermediate fluid pressure chamber in the pilot valve in fluid communication with a fluid pressure responsive element, such as a diaphragm, in the control valve for the main flow line.

The pilot valve comprising the invention has a valve body with the first fluid chamber, a second fluid chamber, and an intermediate fluid chamber between the first and second fluid chambers. The first fluid chamber is in fluid communication with the sensed fluid in the main flow line on one side of the control valve and has a fluid pressure responsive element therein which includes a slidable body having a first valve seat thereon and positioned between the first fluid chamber and the intermediate fluid chamber. A second valve seat is fixed within the valve body and positioned between the second fluid pressure chamber and intermediate fluid chamber, and a valve member having a pair of cooperating seals thereon is mounted within the intermediate fluid chamber adjacent the first and second valve seats for sealing against the first and second valve seats. The second fluid chamber is in fluid communication with the main flow line on the other side of the control valve, and the intermediate fluid chamber is in fluid communication with a fluid responsive element in the control valve.

It is highly desirable that a pilot valve be provided that is highly sensitive or responsive to pressure changes in a sensed fluid so that an accurate flow of fluid occurs between the several fluid chambers as desired, with the movable valve members operating immediately upon such change in pressure in the fluid chamber for the sensed fluid.

The valve element of the present invention comprises a movable spool member having a pair of spaced O-rings fitting in grooves about the outer periphery thereof for seating selectively against the valve seats separating the intermediate chamber from the first and second fluid chambers. The spool member is fluid pressure balanced so that it is responsive to relatively small changes in fluid pressure in the first fluid pressure chamber. For this purpose, the O-rings are mounted in grooves about the periphery of the spool valve having a depth substantially greater than the cross-sectional radius of the O-rings and seat against relatively sharp edges on the valve seats thereby minimizing frictional contact during movement of the valve member between seated and unseated positions.

Another feature of this invention is the arrangement of a predetermined time delay in fluid pressure signals to the control valve from pressure changes of the sensed fluid pressure in the first fluid pressure chamber thereby to dampen a response. This is provided by a damping diaphragm separating the intermediate fluid chamber into two intermediate fluid chamber portions in fluid communication with each other, one intermediate fluid chamber portion in selective fluid communication with the first and second fluid pressure chambers, the other intermediate fluid chamber portion being a fluid balancing chamber. A restriction or orifice is positioned in the fluid passageway or line between the fluid chamber portions, and fluid communication to the control valve from the intermediate fluid chamber is through the reduction thereby to provide a delayed pressure response or signal to the control valve.

The present invention is particularly adapted for utility over a wide range of operating pressures and different embodiments are shown for different pressure ranges. A preferred embodiment of the invention is directed to pressure ranges of an intermediate level from around thirty (30) PSI to around fifteen hundred (1,500) PSI, and in this embodiment, a diaphragm is provided for the first fluid pressure chamber to sense the fluid pressure to be controlled. When fluid pressures over around fifteen hundred (1,500) PSI are encountered, an embodiment of the pilot valve for high pressure is utilized having a metal piston in the first fluid chamber in lieu of a diaphragm. When low pressures are encountered under around fifteen (15) PSI, an embodiment of the pilot valve is provided in which a relatively large fluid chamber for the sensed fluid pressure is positioned between a pair of diaphragms thereby to provide a highly responsive pilot valve for low pressures.

An object of the present invention is to provide an improved non-flowing pilot valve for controlling a control valve in a main flow line which regulates or controls the sensed fluid pressure, either upstream or downstream.

An additional object of the present invention is to provide a highly sensitive pilot valve having a first fluid chamber for the sensed fluid pressure from a flow line on one side of the control valve, a second fluid pressure chamber in fluid communication with the flow line on the other side of the control valve, and an intermediate fluid chamber between the first and second fluid chambers which communicates with a fluid pressure responsive element in the control valve.

An additional object of the present invention is to provide an improved non-flowing pilot valve having an intermediate fluid chamber separated into two fluid chamber portions with an orifice of a predetermined size between the intermediate fluid chamber portions so that a predetermined operational time delay resulting from pressure changes in the sensed pressure is provided to the control valve in the main flow line.

A still further object is to provide an improved non-flowing pilot valve in which a slidable valve member is fluid pressure balanced and has a pair of spaced O-rings thereon for selectively seating on a pair of seats between the fluid pressure chambers with minimal frictional contact, thereby providing a highly sensitive pilot valve.

Other objects, features, and advantages of this invention will become more apparent after referring to the following specification and drawings.

DESCRIPTION OF THE INVENTION

Figures 1, 2:
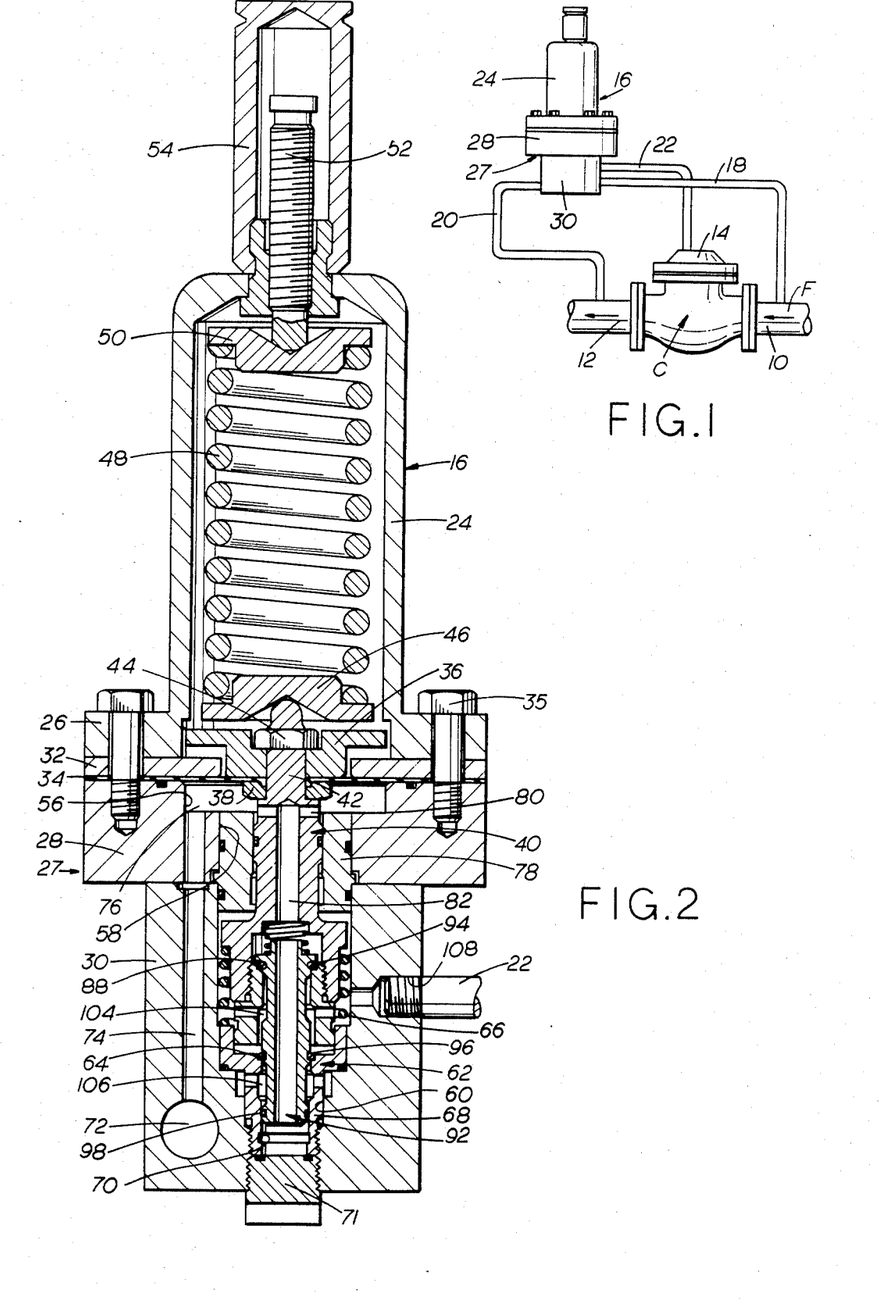
FIG. 1 is a schematic of the no-flow pilot valve comprising the present invention in a system for controlling a control valve in a main flow line.
FIG. 2 is an enlarged longitudinal section of the no-flow pilot valve shown in FIG. 1 with the pilot valve shown in a normal operating position in which fluid flow is blocked between the first, intermediate, and second fluid chambers.

Referring now to the drawings for a better understanding of this invention, and more particularly to the embodiment shown in FIGS. 1-6, a typical system in which the present invention is adapted for use is shown in FIG. 1 and comprises a main flow line indicated at F with a control valve C therein for controlling the flow through flow line F. The upstream end of flow line F is indicated at 10 and a downstream end of flow line F is indicated at 12. The dome of control valve C is indicated at 14 and a pressure responsive element, such as a piston or diaphragm, is normally positioned in dome 14 for controlling the flow of fluid through control valve C as well known in the art.

The pilot valve comprising the present invention is illustrated generally at 16 and has an inlet conduit or line 18 connected thereto from upstream end 10 of the flow line F. Line 20 is connected from the downstream end 12 of flow line F to pilot valve 16, and flow line 22 is connected from pilot valve 16 to dome 14 of control valve C.

Referring to FIG. 2 in which pilot valve 16 is shown in detail, a bonnet 24 is shown having a lower flange 26. The main body of pilot valve 16 comprises an upper body portion 28 and a lower bottom portion 30. A spacer 32 is positioned between bonnet flange 26 and upper body portion 28 in contact with a diaphragm shown at 34. Diaphragm 34 is clamped tightly between spacer 32 and upper body portion 28 by externally threaded bolts 35 threaded within openings of upper body portion 28. Diaphragm 34 is secured between respective upper and lower diaphragm plates 36 and 38 which are mounted on a slidable piston body or member indicated generally at 40. Body 40 has a reduced diameter upper end 42 secured by a nut 44 to diaphragm plates 36 and 38 so that piston body 40 moves with diaphragm 34. An adjustable spring 48 is compressed between spring followers 46 and 50 and urges diaphragm 34 and body 40 downwardly as viewed in FIGS. 2 and 3. An adjusting screw 52 may be manually adjusted to provide a desired compression of adjusting spring 48, such as around five hundred (500) pounds, for example. A suitable cap 54 protects adjusting screw 52.

Body 27 has a central bore or opening therethrough defining the upper enlarged bore portion 56, an intermediate bore portion 58, and a small diameter bore portion 60 at its lower end. A lower generally cup-shaped seat member generally indicated 62 is mounted within intermediate bore portion 58 and has an internal shoulder on an upper sleeve portion 63 forming lower valve seat 64 for engaging a seal. A body spring 66 about slidable body 40 is compressed between seat member 62 and body 40 to urge diaphragm 34 and piston body 40 upwardly against the bias of adjustable spring 48. A lower sleeve portion 68 of seat member 62 is threaded within small diameter bore portion 60 and defines an inner periphery 70. A threaded plug 71 closes the end of the bore through body 27.

A large diameter inlet port 72 is connected to line 18 and a connecting inlet bore 74 leads to an inlet fluid chamber 76 defined by large diameter bore portion 56. A sleeve 78 mounted within intermediate bore portion 58 receives piston body 40 for relative sliding movement. Piston body 40 has a cross port 80 therein communicating with a central bore 82 having an enlarged diameter opening formed by a lower bore portion 84. A sleeve 86 is threaded within lower bore portion 84 and defines a seat 88 on its upper end. Sleeve 86 also has a cross port 90 therein.

A spool valve member is generally indicated at 92 and is received within the enlarged diameter opening formed by lower bore portion 84 and sleeve 86 in telescoping relation. Spool 92 has three O-rings mounted about its outer periphery, an upper O-ring 94 adapted to seat on upper seat 88, an intermediate O-ring 96 adapted to seat on lower seat 64, and a lower O-ring 98 which is adapted to seal at all times along surface 70 defining the inner periphery of lower sleeve portion 68. A light spring 100 engages the upper end of spool valve 92 to urge spool valve 92 and O-rings 94 and 96 thereon into sealing engagement with seats 88 and 64 as shown in FIG. 2. Spool valve 92 has an axial bore 102 therethrough which is in continuous fluid communication with inlet valve chamber 76 at all times through bore 82 and cross port 80, therefore to provide a fluid balance spool valve 92.

An intermediate fluid pressure chamber 104 is provided between seats 64 and 88 and an outlet fluid chamber 106 is provided below seat 64 and O-ring 98. Intermediate port 108 provides fluid communication between intermediate fluid chamber 104 and dome 14 of control valve C through line 22. Outlet port 110 shown in FIG. 6 through body portion 30 provides fluid communication between outlet chamber 106 and line 20 which extends to downstream end 12 of flow line F.

Figure 5:
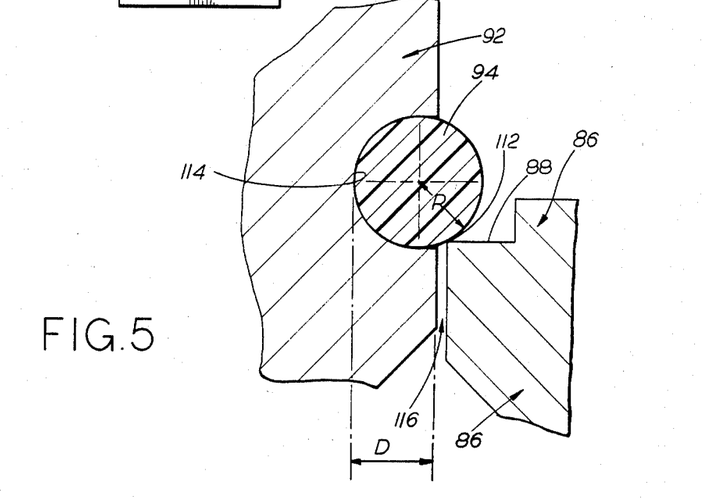
FIG. 5 is an enlarged section of an O-ring on the spool valve and an adjacent valve seat forming a relatively sharp contact therewith.
Figure 6:
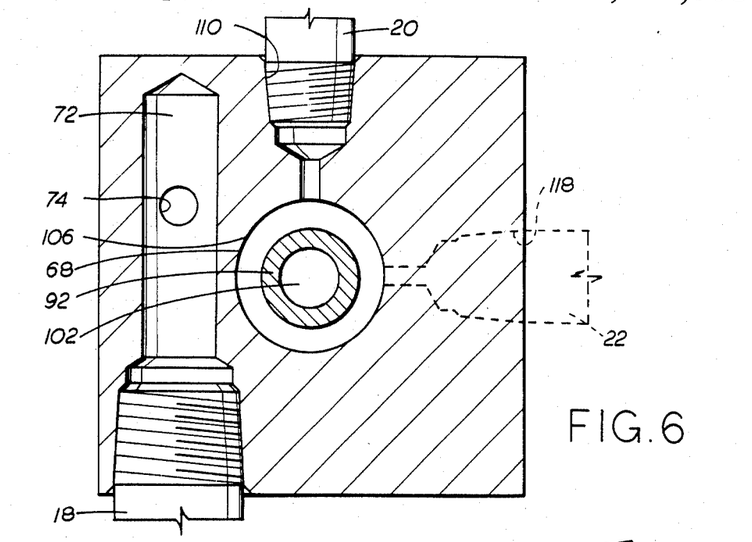
FIG. 6 is a section taken generally along line 6—6 of FIG. 3.

Referring to FIG. 5, an enlarged section is shown of the seating and sealing relationship between O-ring seal 96 and seat 64. In order for pilot valve 16 to have the desired sensitivity or responsiveness to fluid pressure changes in the sensed fluid in fluid chamber 76, it is desirable that a very light seating relation be provided with minimal frictional contact so that unseating of the valve seats may be provided by a relatively small change in fluid pressure in chamber 76, if desired. Seat 88 formed by a shoulder has a relatively sharp edge portion at 112. Groove 114 about the periphery of spool valve 92 has a depth measured at D substantially greater than the radius R of O-ring 96. O-ring 94 is stretched into groove 114. A minimal deformation of O-ring 94 occurs upon seating of O-ring 94 on edge 112 and a minimal seating load is required. As soon as seal 94 opens, fluid is throttled in a narrow gap 116 between the outer periphery of spool 92 and sleeve 86 of slidable body 40 to provide fluid flow between fluid chamber 76 and intermediate fluid chamber 104. O-ring 96 seats in a similar manner on seat 64.

In operation, the operating position of pilot valve 16 is shown in its normal no-flow relation in which seals 94 and 96 on spool valve 92 are seated against respective seats 88 and 64, thereby blocking flow between inlet fluid pressure chamber 76, intermediate fluid pressure chamber 104, and outlet fluid pressure chamber 106. The sensed fluid pressure in fluid pressure chamber 76 which is the fluid pressure being controlled is within a predetermined pressure range. Upon an increase in fluid pressure in the upstream end of flow line F beyond a predetermined amount determined by adjustable spring 48, diaphragm 34 and slidable piston body 40 secured thereto move upwardly to the position shown in FIG. 3 to unseat seal 96 from seat 64 and permit fluid flow between intermediate fluid chamber 104 and fluid chamber 106. It is noted that spool valve 92 is moved upwardly by engagement of seat 88 with seal 94 and thus, sealing relation is maintained between seal 94 and seat 88 to block fluid communication between intermediate fluid chamber 104 and fluid chamber 76. Upon unseating of seal 96 from seat 64, fluid pressure in dome 14 is communicated through line 22, intermediate fluid chamber 104, fluid chamber 106, and to reduce fluid pressure in dome 14 and thereby increase the flow through control valve C and upstream end 10 for reducing fluid pressure in line 18 to fluid chamber 76. It is noted that seal 94 is always seated when seal 96 is unseated and likewise, seal 96 is always seated when seal 94 is unseated. Thus, there is never any direct fluid communication between inlet fluid chamber 76 and outlet fluid chamber 106. The pressure in intermediate chamber 104 normally does not reach the pressure in outlet fluid chamber 106. The fluid pressure of intermediate chamber 104 is normally between the pressure in inlet fluid chamber 76 and the pressure in outlet fluid chamber 106. With adjustable spring 48 set at five hundred (500) pounds, for example, the intermediate fluid pressure may, for example, be around 25 to 50 PSI below the inlet pressure in chamber 76 and may be around 20–30 PSI, for example, above the pressure in outlet fluid chamber 106.

Upon a reduction in fluid pressure in line 18, fluid pressure is reduced in fluid pressure 76. Spring 48 then returns diaphragm 34 and piston body 40 downwardly with a reseating of seal 96 on seat 64, thereby blocking fluid communication between intermediate fluid chamber 104 and fluid chamber 106. Further downward movement of diaphragm 34 and piston body 40 upon a reduction in the sensed fluid pressure in fluid chamber 76 below a predetermined minimum results in the unseating of seal 94 from seat 88 and fluid communication between intermediate fluid chamber 104 and inlet fluid chamber 76 as shown in FIG. 4, thereby permitting fluid communication between line 22 to dome 14 and inlet line 18. In this position, fluid flow is blocked between intermediate fluid chamber 104 and outlet fluid chamber 106 by seal 96 seated on seat 64. An increase in fluid pressure in intermediate fluid chamber 104 from inlet chamber 76 results in the return of diaphragm 34 and piston body 40 to the position of FIG. 2 in which seal 94 is reseated on seat 88 and fluid flow is blocked between inlet chamber 76, intermediate fluid chamber 104, and outlet fluid chamber 106. In this position, the fluid pressure in intermediate fluid chamber 104 is stabilized. The above positions shown in FIGS. 2, 3, and 4 provide a full cycle of opening and closing of pilot valve 16.

Figure 3:
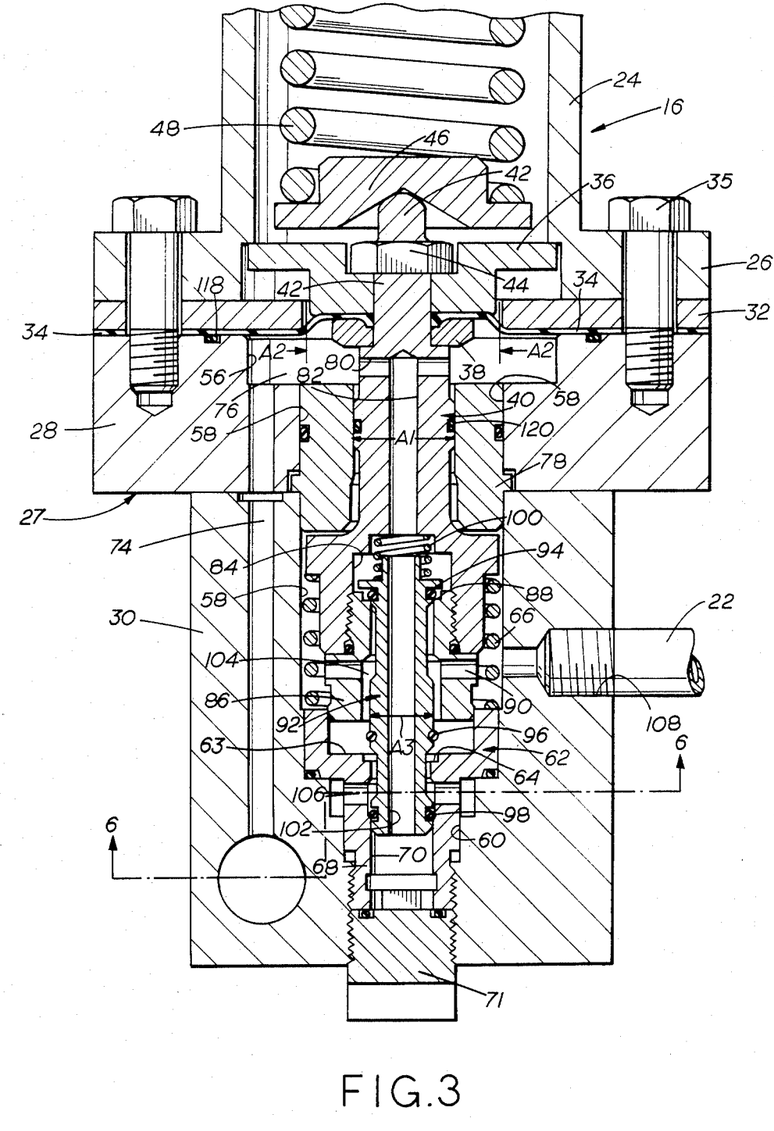
FIG. 3 is an enlarged fragment of FIG. 2 showing the position of the valve members with an increased fluid pressure in the first fluid chamber, the spool valve being unseated from the seat between the intermediate and second fluid chambers to permit flow therebetween, and seated on the seat between the first fluid chamber and the intermediate fluid chamber to block flow therebetween.
Figure 4:
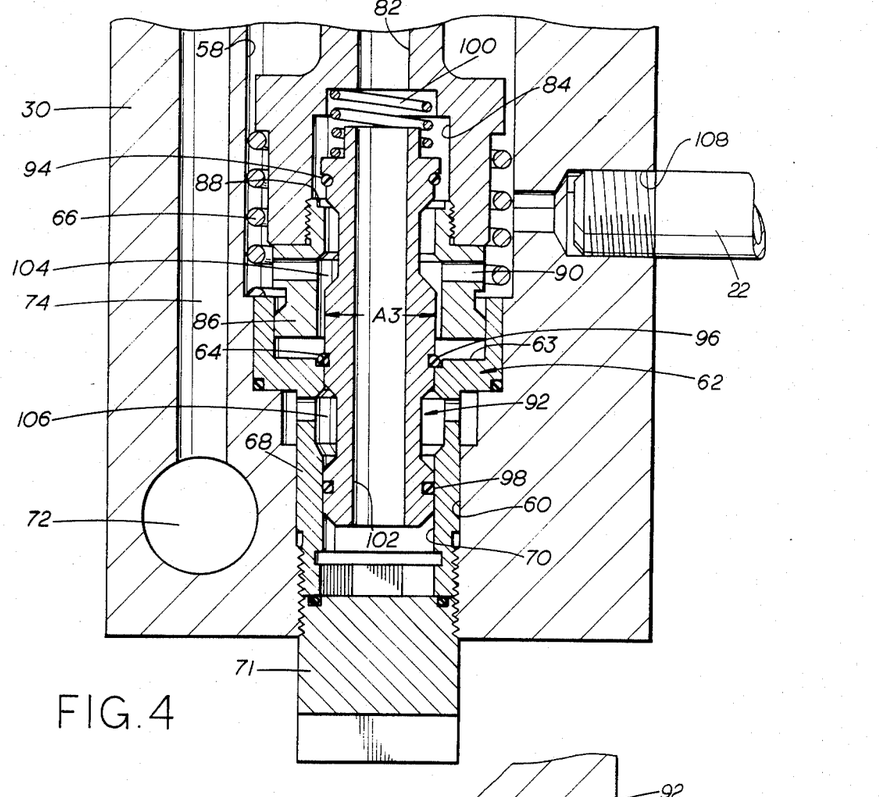
FIG. 4 is an enlarged section of a portion of FIG. 3 showing the position of the valve members with a decreased fluid pressure in said first fluid chamber, the spool valve being unseated from the seat between the first fluid chamber and the intermediate fluid chamber to permit flow therebetween, and seated on the seat between the intermediate fluid chamber and second fluid chamber to block fluid flow therebetween.

Pilot valve 16 has a predetermined sensitivity or responsiveness relating to the opening and closing of seals 94 and 96 resulting from changes in pressure in fluid chambers 76, 104, and 106. The amount of reduction in fluid pressure in dome 14 through intermediate fluid line 22 is proportional to to the increase in fluid pressure through line 18 and by the area differentials between the effective diameters of diaphragm 34, piston body 40, and O-rings seals 94, 96. The following formula has been employed to obtain a ratio R:

$$R = \frac{A2 - A1 + A3}{A1 - A3} \quad (1)$$

where (2) A2 is the effective area of diaphragm 34 defined substantially by the mean diameter of the gap or clearance between spacer 32 and plate 36 as shown in FIG. 3.

(3) A1 is the area of piston body 40 defined within the diameter of O-ring 120 about the outer circumference of piston body 40; and (4) A3 is the area defined within the seating diameter of O-ring 94 or O-ring 96.

A higher ratio R results in a greater degree of sensitivity, and for example, a ratio R of around twenty (20) has been found to be satisfactory for the embodiment of FIGS. 1-6. Thus, pilot valve 16 may be tailored or designed for the particular sensitivity desired. If pilot sensitivity is at a maximum, a fast response or snap action is provided rather than a slower modulating action. Therefore, the primary parameters in providing a specific sensitivity for pilot valve 16 would be the areas A1, A2 and A3. Of course, the force exerted by springs 48, 66, and 100 likewise are selected with the sensitivity desired for pilot valve 16.

It is noted that spool valve 92 is fluid pressure balanced as a result of central bore 102 communicating fluid pressure from inlet chamber 76 to the lower end of spool valve 92, thereby permitting the seating and unseating of spool valve 92 with a relatively light or small fluid pressure.

Figure 7:
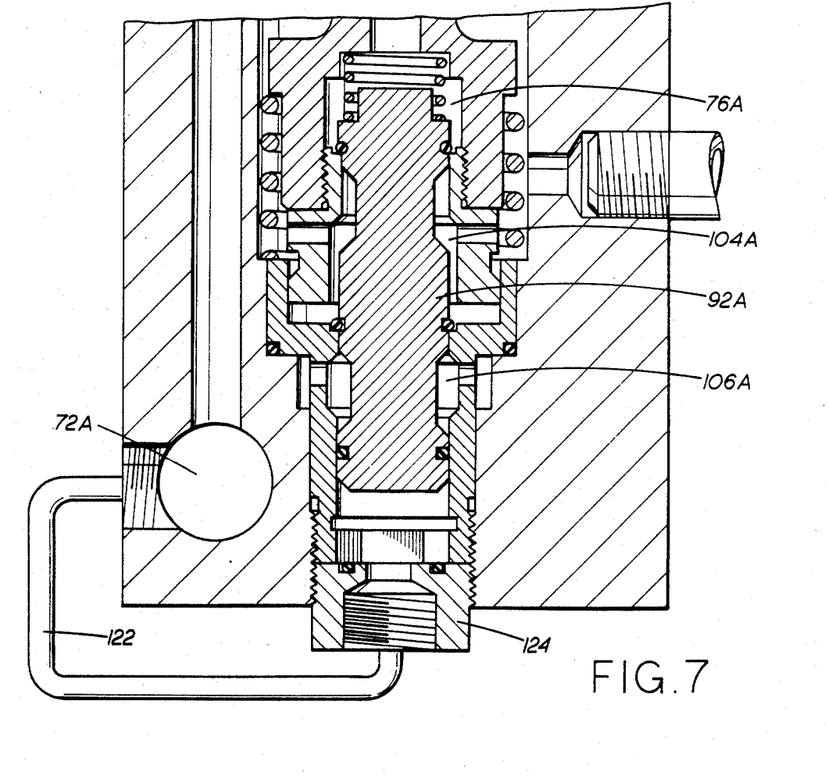
FIG. 7 is a partial sectional view of another embodiment of the invention in which a bypass line from the fluid inlet line is in fluid communication with an end of the spool valve to provide fluid balancing.

Referring to FIG. 7, another embodiment of the invention is illustrated. A solid spool valve 92A is shown for sealing between inlet fluid chamber 76A, intermediate fluid chamber 104A, and outlet fluid chamber 106A. A bypass line 122 is connected to fluid inlet port 72A and provides fluid communication between fluid inlet line 18 and the adjacent end of spool valve 92A through a fitting sleeve 124 at the end of spool valve 92A. The embodiment of FIG. 7 operates in substantially the same manner as the embodiment of FIGS. 1-6.

Figure 8:
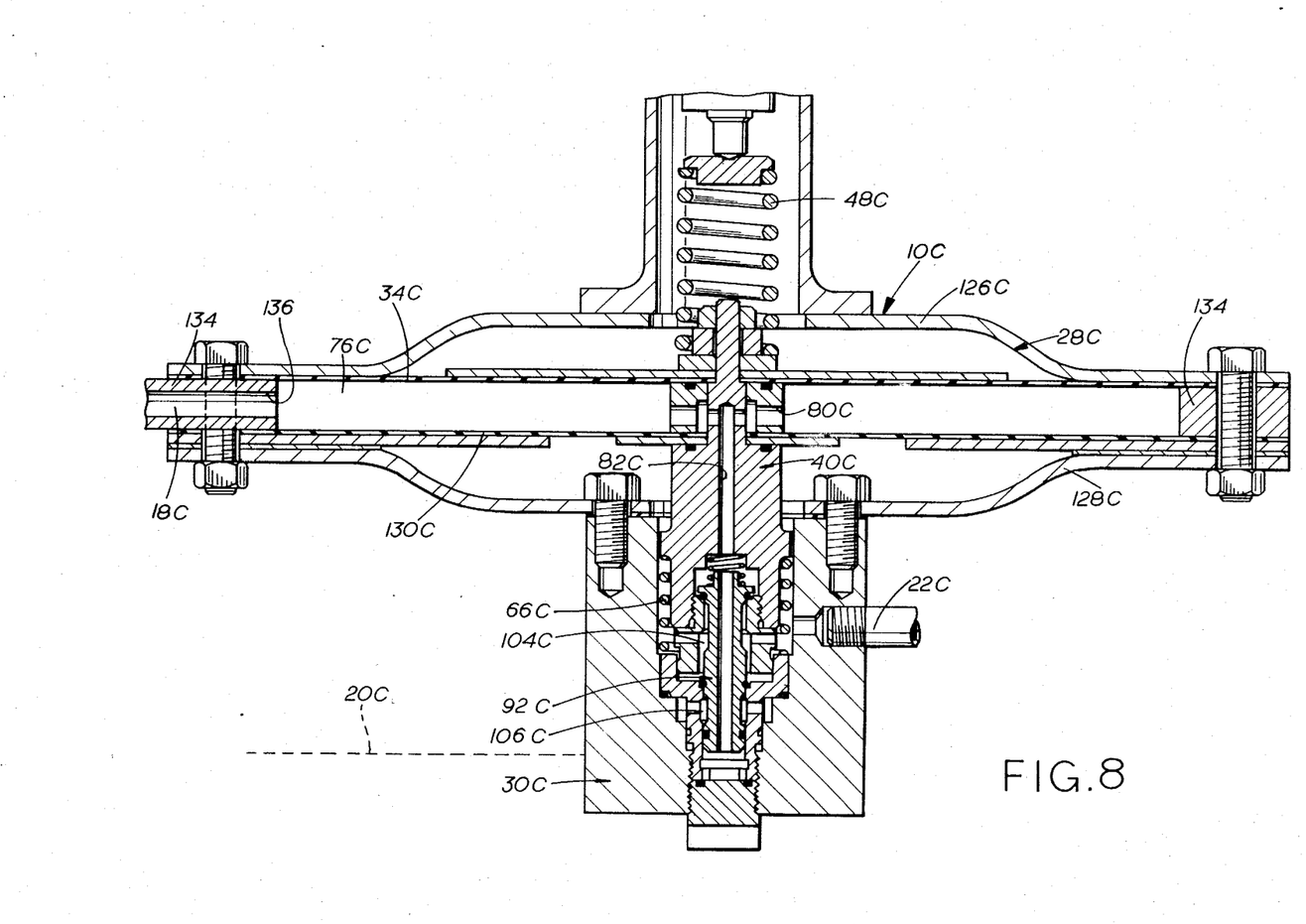
FIGS. 8 and 9 are sectional views of a further embodiment of the invention which is particularly adapted for low fluid pressure such as from 0 to 15 PSI, the inlet fluid chamber being relatively large and positioned between a pair of diaphragms, with FIG. 8 showing an unseated position of the valve member.
Figure 9:
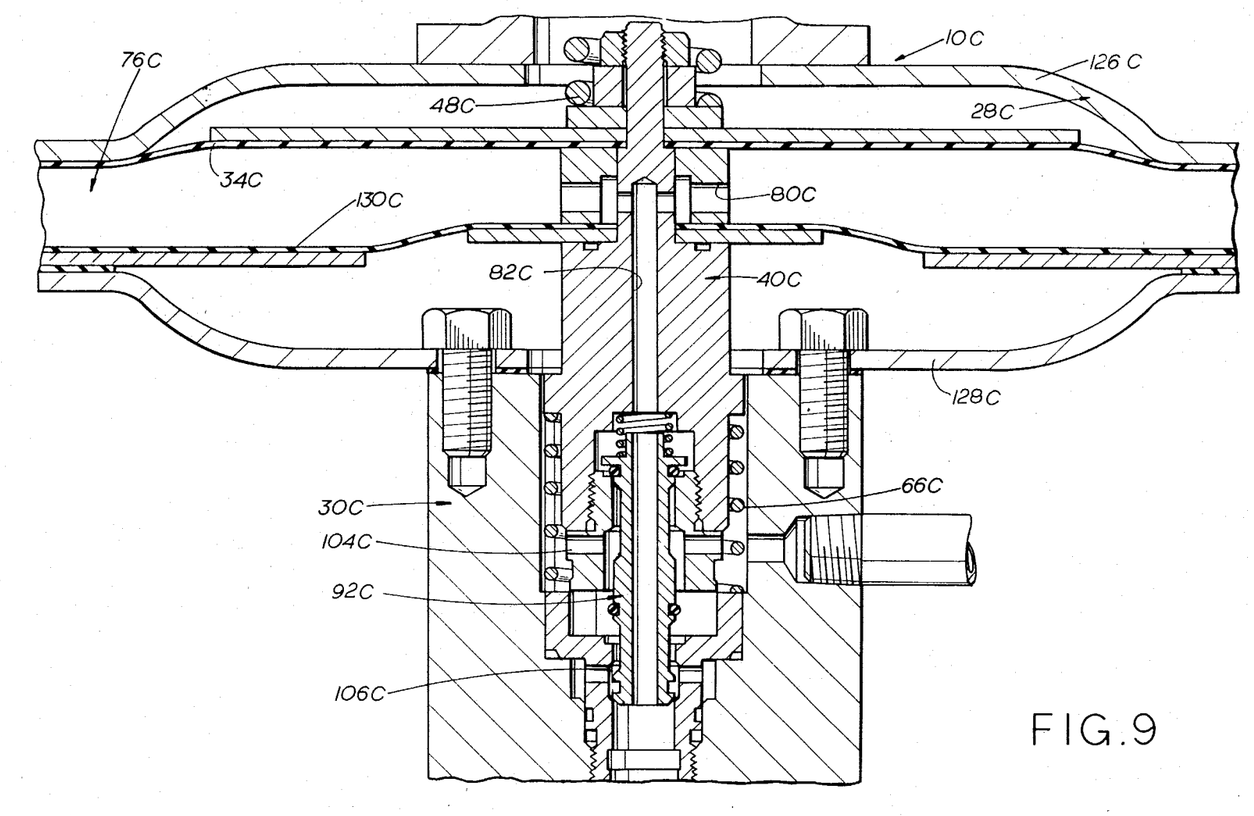

Referring now to FIGS. 8 and 9, an additional embodiment of the invention is shown which is particularly adapted for low fluid pressures from 0 to around 15 PSI, for example. Pilot valve 10C has an upper body portion 28C and a lower body portion 30C. Upper body portion 28C has a lower cover plate 128C and an upper cover plate 126C. An inlet fluid chamber 76C is defined between an upper diaphragm 34C and a lower diaphragm 130C which are clamped between cover plates 126C and 128C having a spacer ring 134 therebetween. An inlet line 18C is connected to an opening 36 in spacer ring 134 to provide fluid communication between the upstream end of the main flow line F with fluid inlet chamber 76C. Fluid from inlet chamber 76C is in communication with cross port 80C and axial bore 82C to provide inlet fluid through piston body 40C to the end of spool valve 92C which separates intermediate fluid chamber 104C from outlet fluid chamber 106C. Line 22C provides fluid communication between the dome of control valve C and intermediate fluid chamber 104C as in the embodiment of FIGS. 1-6.

Adjustable spring 48C urges piston body 40C and diaphragms 34C and 130C against body spring 66C. Thus, a relatively large fluid inlet chamber 76C between diaphragms 34C and 130C provides a highly sensitive pilot valve 10C. It is noted that spool valve 92C is identical to the embodiment shown in FIGS. 1-6 and is movable with a minimum of sliding frictional contact of the sealing members thereon, thereby to provide the highly sensitive pilot valve 10C. FIG. 9 shows pilot valve 10C in the position with an increased fluid pressure in fluid chamber 76C.

Figure 10:
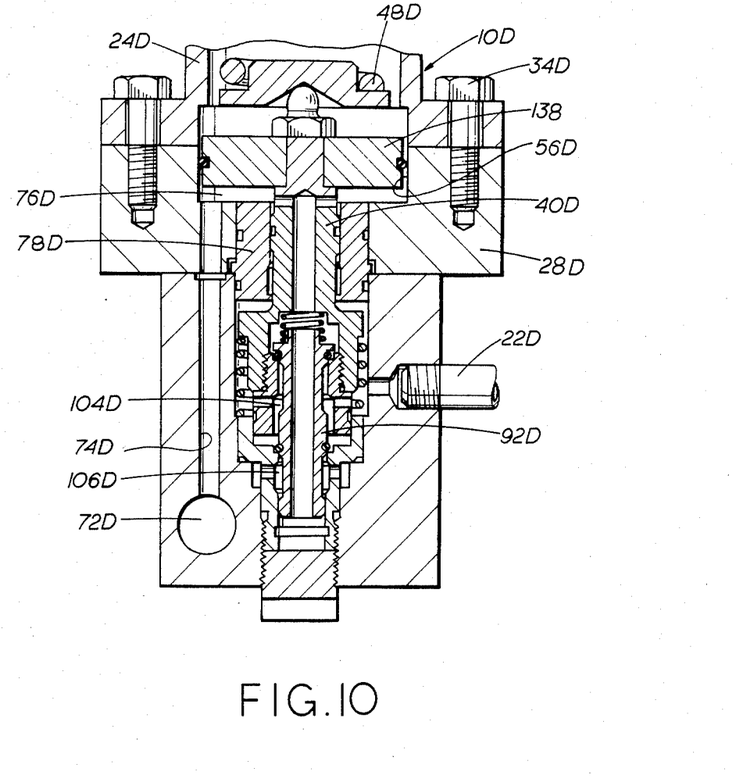
FIG. 10 is a sectional view of a still further embodiment of the invention which is adapted particularly for high fluid pressures such as fluid pressures over 1500 PSI, for example, and illustrating a piston providing a pressure responsive member in the fluid inlet chamber.

Referring to FIG. 10, another embodiment of a pilot valve in which pilot valve 10D is provided particularly for high fluid pressure such as over 1500 PSI, for example. Bonnet 24D is secured to upper body portion 28D by threaded bolts 34D. Inlet port 72D and connecting bore 74D provide fluid communication between the main flow line and fluid inlet chamber 76D adjacent a piston 138 mounted on piston body 40D. Piston 138 is mounted within enlarged diameter bore portion 56D of upper body portion 28D. Spool valve 92D is mounted for sealing and seating relation between inlet chamber 76D, intermediate fluid chamber 104D, and outlet fluid chamber 106D. Line 22D from intermediate fluid chamber 104D leads to the dome for the control valve. An upper sleeve 78D receives the upper end of piston body 40D and an adjustable spring 48D exerts a downward force on piston body 40D. The high fluid pressure embodiment shown in FIG. 10 operates in substantially the same manner as the embodiment shown in FIGS. 1-6. It is noted fluid pressure chamber 76D is smaller than the corresponding fluid pressure chamber in the embodiment of FIGS. 1-6 as higher fluid pressures are encountered.

Figure 11:
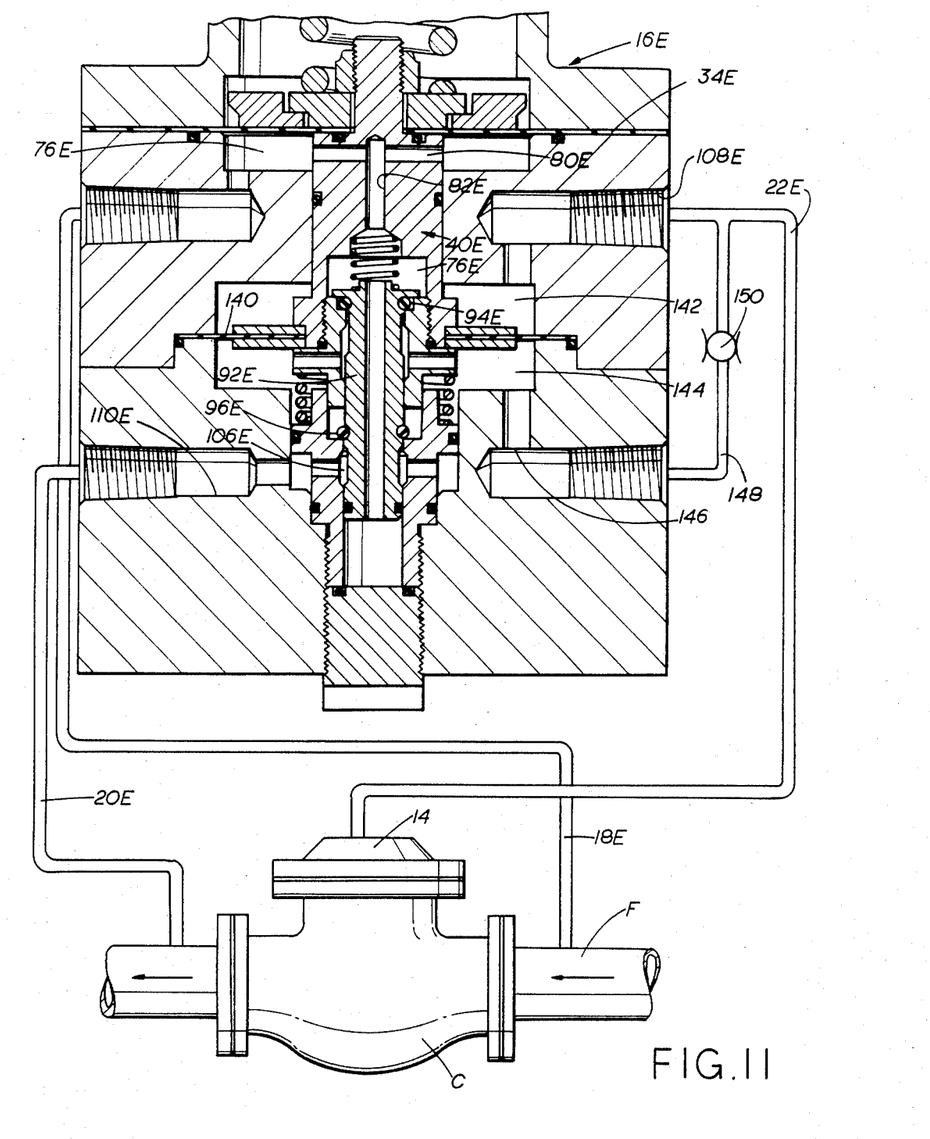
FIG. 11 is an enlarged sectional view, partly schematic, showing an additional embodiment of the invention in which the intermediate fluid chamber is divided into two fluid chamber portions connected by a bypass line with a restriction therein to provide a delayed response to the control valve.

An additional embodiment of the invention is shown in FIG. 11 to provide a delayed response or fluid pressure signal to the control valve resulting from pressure changes in the sensed fluid. The intermediate fluid chamber is separated into two fluid chamber portions in fluid communication with each other through a flow restriction or orifice of a predetermined size so that there is a delayed response to the control valve from the pressure being sensed or controlled. Inlet line 18E provides fluid communication between the upstream portion of flow line F through inlet fluid chamber 76E. Fluid chamber 76E is provided adjacent diaphragm 34E which is secured to piston body 40E. Inlet fluid pressure from chamber 76E is communicated through cross port 80E and bore 82E in piston body 40E to the adjacent end of spool valve 92E. Outlet fluid port 110E provides fluid communication between outlet fluid chamber 106E and the downstream end of flow line F through outlet line 20E.

The intermediate fluid chamber is separated by a damping diaphragm 140 into an upper intermediate fluid chamber portion 142 and a lower intermediate chamber portion 144. Intermediate fluid chamber portion 142 is connected by an upper intermediate fluid port 108E to intermediate flow line 22E leading to dome 14 of control valve C. Lower intermediate fluid chamber portion 144 has a port 146 connected by a bypass or branch line 148 to port 108E and intermediate flow line 22E. Branch line 148 has a flow restriction or orifice 150 therein which is of a predetermined size to meter the flow of fluid between intermediate fluid chamber portions 142 and 144. Intermediate fluid chamber portion 142 acts as a fluid balancing chamber and is not in fluid communication with fluid pressure chambers 76E and 106E. However, intermediate fluid chamber portion 144 is in fluid communication with fluid pressure chambers 76E and 106E in the same manner as intermediate fluid chamber 104 in the embodiment of FIGS. 1-6. Spool valve 92E has upper O-ring 94E thereon blocking fluid flow between inlet fluid chamber 76E and intermediate fluid chamber portion 144, and lower O-ring 96E thereon blocking fluid flow between outlet fluid chamber 106E and intermediate fluid chamber portion 144. Upon an increase in inlet fluid pressure in inlet chamber 76E, seal 96E will be unseated to permit fluid communication between outlet chamber 106E and lower intermediate fluid chamber portion 144. Upon a decrease in pressure in fluid inlet chamber 96E, seal 94E will unseat and fluid communication is provided between fluid inlet chamber 76E and intermediate fluid chamber portion 144. It is noted that intermediate flow line 22E to dome 14 is always in fluid communication with intermediate fluid chamber portion 144 through restriction 150 thereby providing a time delay regardless of the position of spool valve 92A. Such an orifice or restriction 150 combined with damping diaphragm 140 tend to stabilize fluid pressure in chamber portion 144 and minimize any over-responding of pilot valve 16E to temporary erratic changes in the sensed fluid pressure. Such a time delay feature could be utilized, if desired, with other various embodiments of pilot valves having an intermediate fluid pressure chamber between inlet and outlet fluid pressure chambers.

While flow line F has been shown in all of the embodiment as comprising a pipe line or the like, it is understood that inlet line 18 or 18E could be connected to a suitable fluid tank, for example, and function in the same manner as illustrated in the embodiment for FIGS. 1-6.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

We claim:

1. A pilot valve for a control valve in a main flow line comprising:
    a valve body having a first fluid chamber, a second fluid chamber, and an intermediate fluid chamber between said first and second fluid chambers;
    said first fluid chamber being in fluid communication with fluid to be controlled in the main flow line on one side of the control valve and having a fluid pressure responsive means therein, said fluid pressure responsive means including a slidable body extending within said intermediate fluid chamber having a central opening therein in fluid communication with said first fluid chamber, and a first valve seat on said slidable body about said central opening positioned between said first fluid chamber and said intermediate fluid chamber;
    a second valve seat fixed within said valve body positioned between said second fluid pressure chamber and said intermediate fluid chamber;
    a separate floating spool valve received within said central opening adjacent said first valve seat and having cooperating seals thereon for sealing against said first and second valve seats;
    said second valve chamber being in fluid communication with main flow line on the other side of the control valve and said intermediate fluid chamber being in fluid communication with a fluid pressure responsive element in said control valve;
    said spool valve being seated on both said first and second seats in normal operation to block fluid flow between said first, second, and intermediate fluid chambers;
    said fluid pressure responsive means and slidable body moving in response to a predetermined increase in fluid pressure in said first fluid chamber to unseat said spool valve at said second seat to permit fluid communication between said intermediate fluid chamber and said second fluid chamber while maintaining seated position at said first valve seat to block fluid flow between said inlet fluid chamber and said intermediate fluid chamber;
    said fluid pressure responsive means and said slidable body movable in response to a predetermined decrease in fluid pressure in said first fluid chamber to unseat said spool valve at said first seat to permit fluid communication between said inlet chamber and said intermediate chamber while maintaining seated position at said second valve seat to block fluid flow between said second fluid chamber and said intermediate fluid chamber.

2. A pilot valve as set forth in claim 1 wherein said spool valve is elongate and is exposed at both ends thereof to fluid from said first fluid chamber thereby to provide a fluid balanced spool valve.

3. A pilot valve as set forth in claim 2 wherein said spool valve has a pair of O-rings about its outer periphery spaced along the length of said spool valve for selectively engaging said first and second valve seats in a sealing seated relation.

4. A pilot valve as set forth in claim 1 wherein said fluid pressure responsive means comprises a diaphragm responsive to fluid pressure changes upstream of said control valve and said spool valve has a central bore therethrough to provide a fluid balanced relation.

5. A pilot valve as set forth in claim 3 wherein resilient means continuously urge said spool valve into seated relation with said first and second valve seats to block fluid flow between said first, second, and intermediate fluid chambers.

6. A pilot valve as set forth in claim 1 wherein said fluid pressure responsive means comprises a piston and a piston body extends therefrom within the intermediate fluid chamber, said piston body having a central opening in its lower end receiving said spool valve in telescoping relation.

7. A pilot valve for controlling fluid pressure in a control valve for a main flow line comprising:
    a valve body having an upper body portion and a lower body portion, said upper body portion having a first fluid chamber therein, and said lower body portion having a second fluid chamber therein and an intermediate fluid chamber therein between said first and second fluid chambers;

said first fluid chamber having a diaphragm therein and an elongate piston body secured to said diaphragm for movement therewith;

said first fluid chamber being in fluid communication with fluid to be controlled in the main flow line on one side of the control valve, said second fluid chamber being in fluid communication with the main flow line on the other side of the control valve, and said intermediate fluid chamber being in fluid communication with a fluid pressure responsive element in said control valve;

said piston body extending within said intermediate fluid chamber and having a first valve seat thereon positioned between said first fluid chamber and said intermediate fluid chamber;

a second valve seat positioned in fixed relation within the valve body between said second fluid chamber and said intermediate fluid chamber;

a valve member mounted adjacent said first and second valve seats and having a pair of spaced annular seals thereon for selective sealing against said first and second valve seats;

said valve member being seated on both said first and second seats at a predetermined pressure range to block fluid flow between said first, second, and intermediate fluid chambers;

said fluid pressure responsive means and slidable piston body moving in response to a predetermined increase in fluid pressure in said first fluid chamber to unseat said spool valve at said second seat to permit fluid communication between said intermediate fluid chamber and said second fluid chamber while maintaining seated position at said first valve seat to block fluid flow between said inlet fluid chamber and said intermediate fluid chamber;

said fluid pressure responsive means and said slidable piston body movable in response to a predetermined decrease in fluid pressure in said first fluid chamber to unseat said spool valve at said first seat to permit fluid communication between said inlet chamber and said intermediate chamber while maintaining seated position at said second valve seat to block fluid flow between said second fluid chamber and said intermediate fluid chamber.

8. A pilot valve as set forth in claim 7 wherein said slidable piston body has an enlarged central bore at its lower end, and said valve member comprises a spool valve having an upper end received within said enlarged central bore of the piston body.

9. A pilot valve as set forth in claim 7 wherein an adjustable compression spring continuously urges said diaphragm and piston body in one direction, and a second compression spring within said valve body engages said piston body and continuously urges said piston body and diaphragm against the bias of said adjustable spring.

10. A pilot valve as set forth in claim 7 wherein said valve member is an elongate fluid pressure balanced spool valve having a pair of spaced O-rings about its outer periphery for selectively engaging said first and second valve seats in a sealing relation.

11. A pilot valve as set forth in claim 10 wherein said spool valve has a pair of annular grooves about its periphery receiving said O-rings, said grooves having a depth substantially greater than the cross sectional radius of the O-rings.

12. A pilot valve for communicating a fluid pressure signal to a control valve in a main flow line comprising:

a valve body having an upper body portion and a lower body portion, a first port communicating with a first fluid chamber in said upper body portion and in fluid communication with fluid pressure to be controlled in the main flow line on one side of the control valve for sensing said fluid pressure;

a second port communicating with a second fluid chamber in said lower body portion and in fluid communication with the main flow line on the other side of the control valve; and a third intermediate port communicating with a third intermediate fluid chamber in said lower body portion between said first and second fluid chambers and in fluid communication with a fluid pressure responsive control element in said control valve;

fluid pressure responsive means within said first body portion on one side of said first fluid chamber and responsive to fluid pressure at said first port;

fluid pressure responsive means in said intermediate fluid chamber separating said intermediate fluid chamber into two intermediate fluid chamber portions, one intermediate fluid chamber portion in selective fluid communication with said first and second fluid chambers, and the other intermediate fluid chamber portion in fluid communication with said intermediate port at all times;

a connecting fluid conduit between said intermediate fluid chamber portions and an orifice of a predetermined size in said connecting fluid conduit to meter the flow of fluid between said intermediate fluid chamber portions thereby providing a delayed pressure signal to said control valve resulting from immediate changes in fluid pressure in said first fluid pressure chamber.

13. A pilot valve as set forth in claim 12 wherein said fluid responsive means within said first body portion on one side of said first fluid chamber comprises a diaphragm, and said fluid pressure responsive means in said intermediate fluid chamber comprises a diaphragm separating said intermediate fluid chamber into two fluid chamber portions.

14. A pilot valve as set forth in claim 12 wherein:

a first valve seat is provided between said first fluid chamber and said one intermediate fluid chamber portion;

a second valve seat is provided between said second fluid chamber and said one intermediate fluid chamber portion;

and a spool valve is mounted in said intermediate fluid chamber for movement between seated and unseated positions relative to said first and second valve seats for selectively blocking and permitting fluid flow between said one intermediate fluid chamber portion and said first and second fluid chambers.

15. A pilot valve as set forth in claim 14 wherein said spool valve is fluid pressure balanced and has a pair of O-rings about its outer periphery spaced along the length of said spool valve for selectively engaging said first and second valve seats in sealing seated relation.

16. A pilot valve as set forth in claim 14 wherein said spool valve has an axial bore therethrough in fluid communication with said first fluid chamber to provide a fluid pressure balanced spool.

17. A pilot valve for a control valve in a main flow line comprising:

a valve body having a first fluid chamber, a second fluid chamber, and an intermediate fluid chamber between said first and second fluid chambers;

said first fluid chamber being in fluid communication with a sensed fluid in the main flow line and having a fluid pressure responsive means therein, said fluid pressure responsive means including a pressure responsive member and a slidable body member extending within said intermediate fluid chamber, said intermediate fluid chamber having a port in fluid communication with a pressure responsive element in said control valve, a first valve seat within said valve body positioned between said first fluid chamber and said intermediate fluid chamber;

a second valve seat within said valve body positioned between said second fluid pressure chamber and said intermediate fluid chamber;

a valve member mounted in said intermediate fluid chamber adjacent said first valve seats and having cooperating seals thereon for sealing against said first and second valve seats;

fluid pressure responsive means in said intermediate fluid chamber separating said intermediate fluid chamber into two intermediate fluid chamber portions, one intermediate fluid chamber portion in selective fluid communication with said first and second fluid chambers, and the other intermediate fluid chamber portion in fluid communication with said intermediate port at all times;

a connecting fluid conduit between said intermediate fluid chamber portions and an orifice of a predetermined size in said connecting fluid conduit to meter the flow of fluid between said intermediate fluid chamber portions thereby providing a delayed pressure signal to said control valve resulting from immediate changes in fluid pressure in said first fluid pressure chamber.

18. A pilot valve as set forth in claim 17 wherein said valve member is a floating spool valve having a pair of spaced O-rings thereon for engaging said first and second valve seats.

19. A pilot valve as set forth in claim 17 wherein said pressure responsive means in said intermediate fluid chamber comprises a diaphragm, and said pressure responsive member in said first fluid chamber comprises a diaphragm;

said slidable body having a central bore communicating with said first fluid chamber and having said first valve seat thereon.

20. A pilot valve for a control valve in a main flow line comprising:

a valve body having a first fluid chamber, a second fluid chamber, and an intermediate fluid chamber between said first and second fluid chambers;

said first fluid chamber being in fluid communication with fluid to be controlled in the main flow line on one side of the control valve and having a fluid pressure responsive means therein, said fluid pressure responsive means including a slidable body extending within said intermediate fluid chamber and a first valve seat on said slidable body positioned between said first fluid chamber and said intermediate fluid chamber;

a second valve seat within said valve body positioned between said second fluid pressure chamber and said intermediate fluid chamber; and a separate floating spool valve received within said intermediate fluid chamber and having cooperating seals thereon for sealing against said first and second valve seats;

said floating spool valve having a pair of O-rings mounted in grooves about the outer periphery thereof for sealing against said first and second valve seats, said grooves having a depth substantially greater than the radius of said O-rings, said O-rings being in sealing engagement with said seats within a predetermined fluid pressure range in said first fluid chamber to block fluid flow between said first, second, and intermediate fluid chambers.

21. A pilot valve as set forth in claim 20 wherein said slidable body has a central bore therein with an enlarged diameter portion within said intermediate fluid chamber receiving said spool valve in telescoping relation, and spring means urge said spool valve into sealing engagement with said first and second seats.

22. A pilot valve as set forth in claim 21 wherein said spool valve has an axial bore therethrough to provide fluid pressure balancing thereof.

23. A pilot valve as set forth in claim 21 wherein said fluid pressure responsive means includes a piston within said first fluid pressure chamber, and said slidable body comprises a piston body extending from said piston within said intermediate fluid chamber.

* * * * *